United States Patent Office 3,056,840
Patented Oct. 2, 1962

3,056,840
PROCESS FOR THE SELECTIVE CONVERSION OF ACROLEIN TO PROPIONALDEHYDE
Wilfred B. Howsmon, Jr., Aurora, Ohio, assignor to The Standard Oil Company, Cleveland, Ohio, a corporation of Ohio
No Drawing. Filed Aug. 31, 1959, Ser. No. 836,947
4 Claims. (Cl. 260—601)

The present invention relates to a process for the selective conversion of acrolein to propionaldehyde. More particularly, the process of this invention makes possible the selective liquid phase catalytic hydrogenation of acrolein to propionaldehyde under moderate temperature and pressure conditions.

It is well known to those skilled in the art that acrolein is readily polymerized because of its unsaturated nature, particularly at higher temperatures. Consequently, it is desirable to conduct the hydrogenation of acrolein at relatively low temperatures in order to minimize this polymerization. Although the hydrogenation of acrolein has been reported heretofore, the methods of the prior art are not selective and yield n-propanol and/or allyl alcohol as well as propionaldehyde. In certain instances it is desirable to convert acrolein to propionaldehyde without appreciable formation of either n-propanol or allyl alcohol, and my invention is concerned particularly with a process employing a selected group of catalysts, to be discussed hereinafter, which accomplish the selective conversion of acrolein to propionaldehyde to the substantial exclusion of the other possible hydrogenation byproducts of acrolein.

In brief, the process of my invention is conducted by subjecting acrolein to liquid phase hydrogenation in the presence of a catalyst selected from the group consisting of ruthenium and rhodium at moderate temperatures and pressures.

The catalyst which is employed in the process of this invention is critical and I have found that ruthenium and rhodium will give good results under the proper reaction conditions. Ordinarily, the catalyst is employed on a suitable support and the final catalyst composition may comprise as little as 1% of the active catalytic ingredient. In most cases the catalyst composition should contain not more than 10% of the active catalytic ingredient since greater concentrations, although operable, are uneconomic. As the support for the catalyst which is utilized in this invention, I prefer to employ charcoal but other supports such as asbestos, silica, and the like may be employed. A unique and surprising property of the named class of catalysts is that platinum does not produce any appreciable quantities of propionaldehyde under the conditions of my process. On the other hand, oxides of platinum such as $PtO_2$ will convert acrolein almost exclusively to n-propanol with no appreciable yield of propionaldehyde.

In general, I prefer to employ a temperature in the range of about 15° C. to about 50° C. and in most cases room temperature is entirely satisfactory, i.e. about 20° C. Lower temperatures require impractical reaction times while higher temperatures promote polymerization. Since the process is conducted in the liquid phase, it is necessary to carry out the reaction under moderate pressures, on the order of 3 to 10 atmospheres. In general, a pressure of about 4 atmospheres appears to give the best results. The process may be carried out continuously or in a batch process and the equipment employed in the process is not critical.

Fairly long contact times on the order of ½ to 8 hours are required in order to carry the reaction to completion, but shorter contact times may be employed with some sacrifice in the conversion level.

It is not necessary that the acrolein introduced to this process be in concentrated form. Although pure acrolein may be employed in this process, it is also possible to treat solutions of acrolein, e.g. acrolein dissolved in water. Aqueous solutions containing as little as 10% acrolein have been successfully utilized in this process.

Considering the chemical structure of acrolein, it is surprising that the process of this invention yields a product which is essentially propionaldehyde since a consideration of the chemistry involved would suggest that the reaction would be difficult to terminate at this point in view of the relative ease with which aldehydes may be hydrogenated to alcohols. Surprising though this fact is, the experiments I have observed clearly show that the process does yield a product which is essentially propionaldehyde.

The invention will be better understood by reference to the following examples which are illustrative of the best mode contemplated for carrying out the invention. In all of these examples the apparatus employed was a Parr low pressure hydrogenation bomb. This unit consists of a hydrogen storage tank which is connected to a glass reaction bottle. The bottle is mounted in a motor-driven shaking device and the valve system on the bottle is arranged so that the bottle can be closed off from the storage tank and evaporated after the sample has been introduced. The unit is also equipped with a small heating element which provides such heating as is necessary to obtain the desired reaction temperature. The examples of my invention now follow:

*Example 1*

One g. of a ruthenium catalyst comprising 5 weight percent ruthenium and a charcoal support were placed in the Parr bomb. Next 10 g. of acrolein were introduced and the bomb was then pressured to 67 p.s.i.a. with hydrogen at a temperature of about 50° C. After 5½ hours, analysis of the bomb's contents showed that 23% of the acrolein had been converted to propionaldehyde and that there was no formation of n-propanol or allyl alcohol.

*Example 2*

One g. of a rhodium catalyst comprising 4 weight percent rhodium and a charcoal support were placed in the Parr bomb. Next 10 g. of acrolein in the form of a 10% aqueous solution were introduced into the bomb and it was then pressured to about 67 p.s.i.a. with hydrogen at a temperature of 27° C. After 1½ hours, analysis showed that 28% of the acrolein had been converted with a yield of about 82% propionaldehyde.

It is apparent from the preceding examples that I have invented a novel and advantageous process for the selective hydrogenation of acrolein to propionaldehyde. Various modifications of the process as described herein will undoubtedly occur to those skilled in the art; and, accordingly, this application for Letters Patent is intended to cover all modifications of the process which reasonably fall within the scope of the appended claims.

I claim:
1. A process for the selective conversion of acrolein to propionaldehyde which comprises hydrogenating liquid acrolein in the presence of a catalyst selected from the group consisting of ruthenium and rhodium at a tempera- ture in the range of about 15° C. to 50° C. and a pressure in the range of about 3 to 10 atmospheres.

2. The process of claim 1 in which the catalyst is ruthenium.

3. The process of claim 1 in which the catalyst is rhodium.

4. A process for the selective conversion of acrolein to propionaldehyde which comprises hydrogenating liquid acrolein in the presence of a catalyst selected from the group consisting of ruthenium and rhodium at a temperature of about 20° C. and a pressure of about 4 atmospheres.

References Cited in the file of this patent

FOREIGN PATENTS

| | | |
|---|---|---|
| 497,757 | Great Britain | Dec. 28, 1938 |
| 126,376 | Sweden | Oct. 18, 1949 |
| 488,712 | Canada | Dec. 9, 1952 |
| 495,714 | Canada | Sept. 1, 1953 |